Inventor
Charles H. Herr, Jr.
by
Attorney

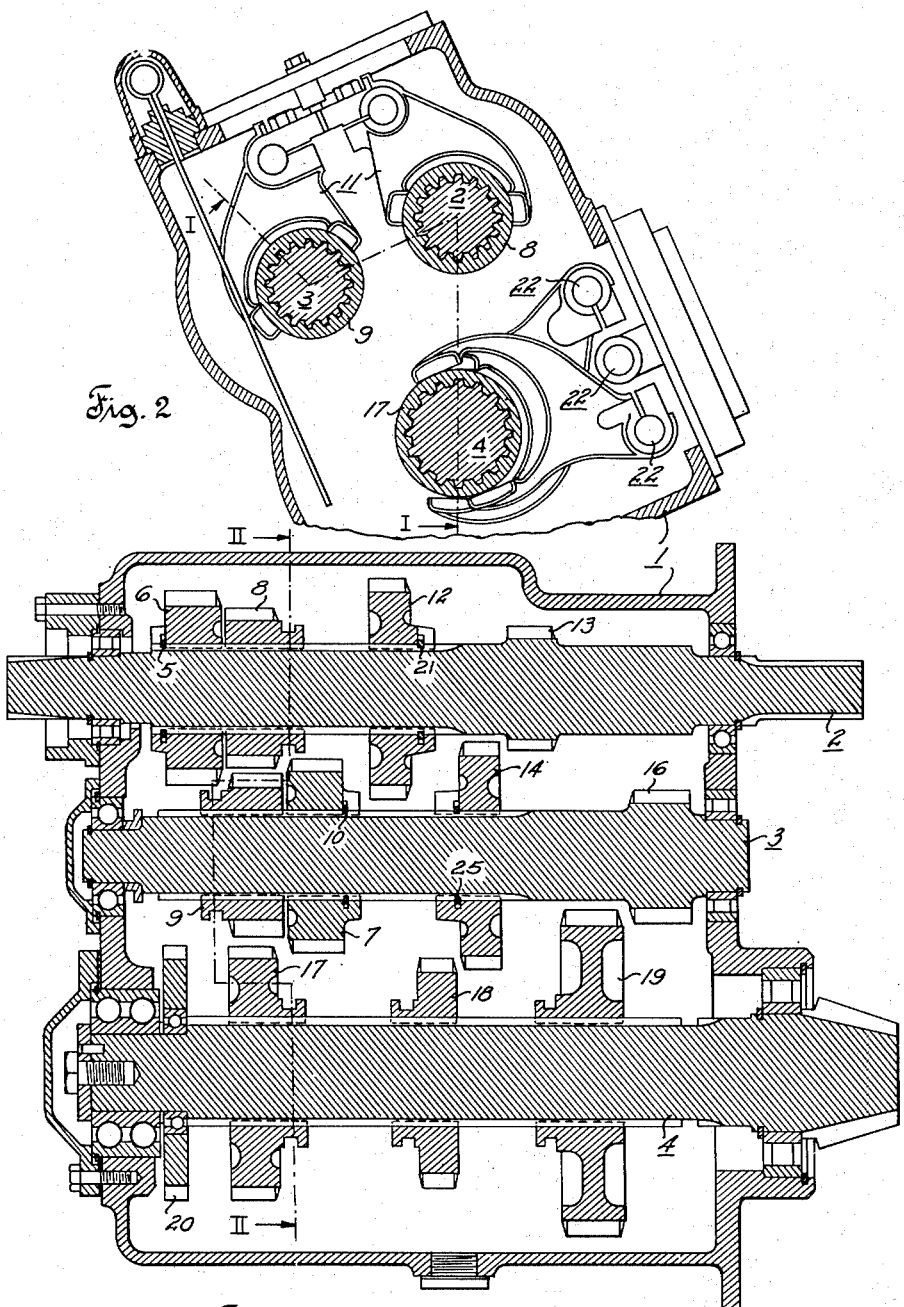

Patented Dec. 26, 1950

2,535,632

UNITED STATES PATENT OFFICE 2,535,632

CHANGE-SPEED TRANSMISSION

Charles H. Herr, Jr., Springfield, Ill., assignor to Allis-Chalmers Manufacturing Company, Milwaukee, Wis., a corporation of Delaware Application May 5, 1949, Serial No. 91,513

15 Claims. (Cl. 74—342)

The invention relates to change speed gearing, and it is concerned more particularly with an automotive transmission of the type in which a set of change speed gears provides for selection of different ranges, and in which another set of change speed gears provides for selection of different speeds in each range.

Transmissions of this type are generally known as multiple range transmissions, and various arrangements of the two sets of change speed gears have heretofore been suggested in order to provide a relatively large number of available reduction ratios between the vehicle engine and the propelling wheels, and to properly proportion these reduction ratios in conformity with the particular requirements of the vehicle in which the transmission is to be used. However, such arrangements of the two sets of change speed gearings as have heretofore been suggested, are believed to have had short comings either in the matter of properly proportioning the available reduction ratios, particularly those for reverse drive, or in the matter of practical requirements, such as minimum number of gears, short axial length, simplicity of construction and low cost manufacture.

Generally, it is an object of the invention to provide a multiple range transmission incorporating an improved arrangement of range and speed selecting gearings, and which will avoid the hereinabove mentioned short comings of the prior art.

More specifically, it is an object of the invention to provide a range and speed selecting gear arrangement of the above mentioned character in which the ratios of the forward and reverse speeds are properly proportioned to meet the speed requirements of a transmission for use in heavy duty motor vehicles, such as crawler tractors.

A further object of the invention is to provide an improved arrangement of the range and speed selecting gearings which will afford a high range and a low range, and a number of forward speeds in each range, and which will also afford a number of reverse speeds which may be established at will irrespective of the condition of the range selecting gearing, that is, any one of the reverse speeds may be established irrespective of whether the range selecting gearing is in neutral or in high range or in low range condition.

A further object of the invention is to provide a range and speed selecting gear arrangement of the above mentioned character which will afford a relatively high and two relatively low reduction ratios in high range for forward drive, a relatively high and two relatively low reduction ratios in low range for forward drive, and three reduction ratios for reverse drive, the lowest of the reverse drive reduction ratios being not lower than the lowest forward drive reduction ratio in high range.

A further object of the invention is to provide a range and speed selecting gear arrangement affording three forward drive reduction ratios in high range, three forward drive reduction ratios in low range, and three reverse drive reduction ratios as set forth hereinbefore, and in which the reduction ratios available in one range are staggered relative to the reduction ratios available in the other range so that the first or lowest speed may be selected in low range, the second or next higher speed may be selected in high range, and the third or next higher speed may be selected in low range, two of the remaining higher forward speeds being available in one range, and the other remaining high forward speed being available in the other range.

With these objects in mind, the invention contemplates a range and speed selecting gear arrangement in which one of the speed selecting gears may selectively cooperate with one of the range selecting gears for transmitting rotation from a transmission input or driving shaft in one direction to a transmission output or driven shaft, and in which the mentioned speed selecting gear may alternatively cooperate with another of the range selecting gears for transmitting rotation from the driving to the driven shaft in the opposite direction, the advantage of such forward and reverse drive arrangement being a saving in the number of required gears, as will appear more fully hereinbelow.

A further object of the invention is to provide a multiple range transmission incorporating an improved forward and reverse drive arrangement as set forth hereinbefore, in which cooperation of the one speed selecting gear with one of the range selecting gears establishes a relatively low forward drive reduction ratio when the range selecting gearing is in high range condition, and a relatively high forward drive reduction ratio when the range selecting gearing is in low range condition, and in which the reverse drive reduction ratio afforded by cooperation of the one speed selecting gear with the mentioned other range selecting gear is higher than the mentioned relatively low forward drive reduction ratio and lower than the mentioned relatively high forward drive reduction ratio.

The foregoing objects and advantages are obtained by the present invention various novel features of which will be apparent from the description herein and from the accompanying drawings, and will be more particularly pointed out in the appended claims.

In the drawings:

Fig. 1 is a sectional view of a double range transmission for a motor vehicle, such as a crawler tractor, not shown, the view of Fig. 1 being taken on line I—I of Fig. 2;

Fig. 2 is a sectional view on line II—II of Fig. 1;

Figure 3:
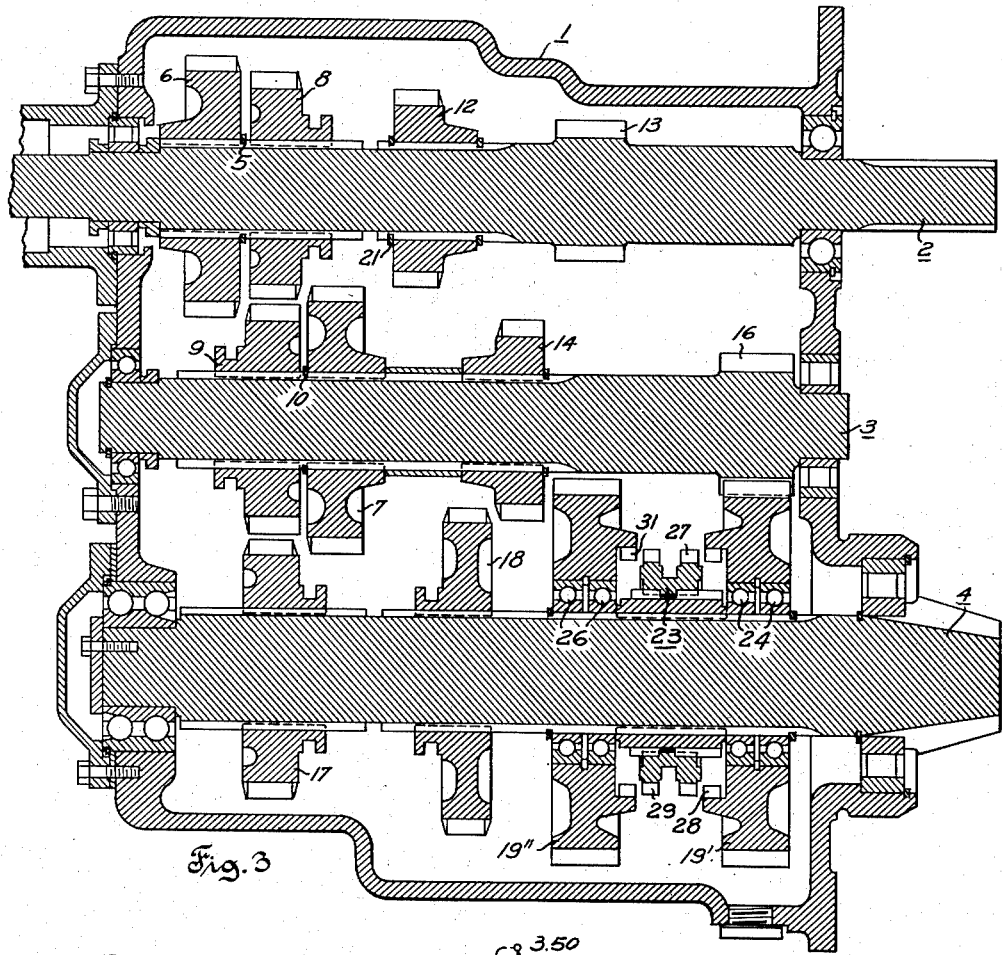
Fig. 3 is a sectional view similar to Fig. 1 and showing a modification of the speed selecting gearing shown in Fig. 1.

Referring to Fig. 1, a housing, generally designated by the reference character 1, is suitably constructed to rotatably mount a driving shaft 2, a countershaft 3, and a driven shaft 4, in spaced parallel relation to each other, the shafts 2, 3 and 4 being shown in Fig. 1 in one plane, although in the transmission as actually constructed, and as best shown in the sectional view of Fig. 2, only the driving shaft 2 and the driven shaft 4 are arranged in a common vertical plane, while the countershaft 3 is offset a predetermined distance from said plane. Range selecting gearing for transmitting power at different speed ratios from the driving shaft 2 to the countershaft 3 comprises axially fixed gears 6 and 7 which are nonrotatably mounted, respectively, on the driving shaft 2 and on the countershaft 3, and axially shiftable gears 8 and 9 which are mounted on the driving shaft 2 and on the countershaft 3, respectively. The gears 6 and 8 have internal splines matching external splines of the driving shaft 2, and the gears 7 and 9 have internal splines matching external splines of the countershaft 3, the gears 6 and 7 being retained in axially fixed positions on their respective shafts by lock rings 5 and 10, respectively.

In the position of the gears 8 and 9 as shown in Fig. 1, the range selecting gearing is in neutral, and in order to establish the low range the gear 8 is shifted from its neutral position into mesh with the gear 7 while the gear 9 remains in its neutral position, and in order to establish the high range the gear 9 is shifted from its neutral position into mesh with the gear 6 while the gear 8 remains in its neutral position. The shifting of the gears 8 and 9 may be effected by means of a gear shift mechanism of conventional construction which is generally indicated in Fig. 2 by the reference character 11.

The speed selecting gearing of the change speed transmission comprises the mentioned gear 6 and two supplemental gears 12 and 13 on the driving shaft 2; the mentioned gear 7 and two supplemental gears 14 and 16 on the countershaft 3; and three gears 17, 18 and 19 on the driven shaft 4. The gears 12 and 13 of the speed selecting gearing are suitably arranged for rotation in unison with the driving shaft 2 in axially nonshiftable relation to the latter, the gear 12 having internal splines matching external splines of the driving shaft 2 and being retained in axially fixed position on the driving shaft 2 by means of a lock ring 21, and the gear 13 being integrally formed with the driving shaft 2. The gears 14 and 16 of the speed selecting mechanism are suitably arranged for rotation in unison with the countershaft 3 in axially fixed relation to the latter, the gear 14 having internal splines matching external splines of the countershaft 3, and being retained in axially fixed position by a lock ring 25, and the gear 16 being integrally formed with the countershaft 3. The driven shaft gears 17, 18 and 19 of the speed selecting gearing are suitably arranged for rotation in unison with the driven shaft 4 in axially shiftable relation to the latter, each of the gears 17, 18 and 19 having internal splines matching external splines of the driven shaft 4. In Fig. 1, the driven shaft gears 17, 18 and 19 are shown in their neutral positions and each of these gears may be shifted from its neutral position either to the right or left by means of a gear shift mechanism of conventional construction which is generally indicated in Fig. 2 by the reference character 22. An oil elevating gear 20 is rotatably mounted on the driven shaft 4 and meshes with the axially fixed gear 6 on the driving shaft 2.

The range selecting gearing 6, 7, 8, 9, as mentioned hereinbefore, affords a high range and low range, and the speed selecting gearing affords three forward drive reduction ratios in each range, and three reverse drive reduction ratios irrespective of the condition of the range selecting gearing.

For first or lowest forward speed the gear 8 is shifted into mesh with the gear 7 to establish the low range, and the gear 19 is shifted into mesh with the gear 16. In this condition the transmission affords the highest available forward drive reduction ratio.

For second forward speed the gear 9 is shifted into mesh with gear 6 to establish the high range, and the gear 19 is shifted into mesh with the gear 16.

For third forward speed the gear 8 is shifted into mesh with the gear 7 to establish the low range, and the gear 17 is shifted into mesh with the gear 7.

For fourth forward speed the gear 8 is shifted into mesh with the gear 7 to establish the low range, and the gear 18 is shifted into mesh with the gear 14.

For fifth forward speed the gear 9 is shifted into mesh with the gear 6 to establish the high range, and the gear 17 is shifted into mesh with the gear 7.

For sixth or highest forward speed the gear 9 is shifted into mesh with the gear 6 to establish the high range, and the gear 18 is shifted into mesh with the gear 14. In this condition, the transmission affords the lowest available forward drive reduction ratio.

For first or lowest reverse speed the gear 19 is shifted into mesh with the gear 13. In this condition, the transmission affords the highest available reverse drive reduction ratio.

For second or intermediate reverse speed the gear 17 is shifted into mesh with the gear 6.

For third or highest reverse speed the gear 18 is shifted into mesh with the gear 12. In this condition, the transmission affords the lowest available reverse drive reduction ratio.

It will be noted that any one of the three reverse drives may be established while the range selecting gears 8 and 9 are in their neutral positions in which they are shown in Fig. 1. In other words, power may be transmitted to the driven shaft 4 selectively at three different speed ratios for reverse drive while the range selecting gearing is in its neutral condition.

As shown in Fig. 1, the pitch diameter of the gear 7 on the countershaft 3 is larger than the pitch diameter of the first range selecting gear 8 which may also be referred to as a first mating gear; and the pitch diameter of the gear 6 on the driving shaft 2 is larger than the pitch diameter of the second range selecting gear 9 which may also be referred to as a second mating gear. As further shown in Fig. 1, the drive and countergears 6 and 7, the first and second range selecting gears 8 and 9 and the speed selecting gear 17 are so proportioned as to permit meshing engagement of the speed selecting gear 17 with the drive gear 6 while the latter gear is in mesh with the second range selecting gear 9, and so as to permit meshing engagement of the speed selecting gear 17 with the countergear 7 while the latter gear is in mesh with the first range selecting gear 8.

From the foregoing explanations it will be apparent that any one of the three reverse drives may not only be established while the range selecting gearing is in its neutral condition, but that any one of the three reverse drives may also be established when the range selecting gearing is either in its low range or in its high range condition, that is, when the gear 8 is in mesh with the gear 7, or when the gear 9 is in mesh with the gear 6.

The following is a table of representative tooth numbers which may be given to the various gears of the transmission shown in Fig. 1:

28 teeth on gear 6
27 teeth on gear 7
23 teeth on gear 8
22 teeth on gear 9
32 teeth on gear 12
16 teeth on gear 13
32 teeth on gear 14
17 teeth on gear 16
36 teeth on gear 17
33 teeth on gear 18
48 teeth on gear 19

Figure 4:
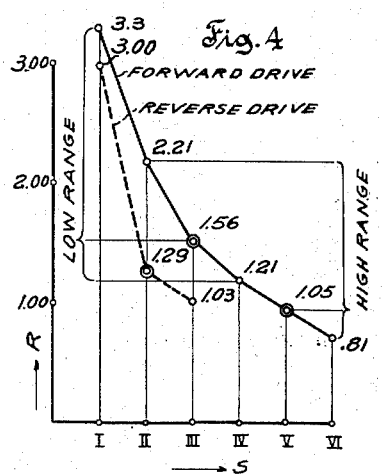
Fig. 4 is a diagram of the forward and reverse drive reduction ratios afforded by the transmission shown in Fig. 1.

The six available forward drive reduction ratios and the three available reverse drive reduction ratios afforded by the transmission shown in Fig. 1 are plotted in the diagram shown in Fig. 4, the various ratios R for the respective speeds S being calculated on the basis of the representative tooth numbers set forth hereinbefore.

Referring to Fig. 4, it will be noted that the range and speed selecting gearing shown in Fig. 1, if arranged and proportioned as indicated hereinbefore for purposes of exemplification, affords a relatively high forward drive reduction ratio 3.3 and two relatively low forward drive reduction ratios of 1.56 and 1.21, respectively, in low range, and that the arrangement and proportioning of the range and speed selecting gearing affords a relatively high forward drive reduction ratio of 2.21 and two relatively low forward drive reduction ratios of 1.05 and .81, respectively, in high range. As to the reverse drive reduction ratios, the diagram of Fig. 4 shows that these, like the forward drive reduction ratios, are adequately proportioned to meet the speed requirements of a transmission for a heavy duty motor vehicle, such as a crawler tractor. As shown in Fig. 4, the lowest available reverse drive reduction ratio is 1.03, and this ratio is not lower than the lowest available forward drive reduction ratio in high range, which is .81.

It will further be noted that in the transmission as shown in Fig. 1, the gear 17 serves the triple purpose of transmitting power from the countershaft 3 to the driven shaft 4 for forward drive in either high or low range, and of transmitting power directly from the gear 6 to the driven shaft 4 for rotating the latter in reverse at the second or intermediate reverse speed reduction ratio of 1.29 indicated in Fig. 4. The arrangement of the range and speed selecting gearing as shown in Fig. 1 has the advantage that it requires no separate reverse idler and therefore affords a saving in the number of required gears.

From Figs. 1 and 4 it will further be noted that cooperation of the speed selecting gear 17 with the axially fixed gear 7 establishes a relatively low forward drive reduction ratio of 1.05 when the range selecting gearing is in high range condition, and a relatively high forward drive reduction ratio of 1.56 when the range selecting gearing is in low range condition, and that the reverse drive reduction ratio of 1.29 which is afforded by cooperation of the speed selecting gear 17 with the range selecting gear 6 is higher than the relatively low forward drive reduction ratio of 1.05 and lower than the relatively high forward drive reduction ratio of 1.56.

Referring to Fig. 3, the transmission shown in this figure generally incorporates the same principles as the transmission shown in Fig. 1, elements of the range selecting gearing shown in Fig. 3 being designated by the same reference characters as the corresponding elements of the range selecting gearing shown in Fig. 1, and elements of the speed selecting gearing shown in Fig. 3 being designated by the same reference characters as the corresponding elements of the speed selecting gear shown in Fig. 1. The speed selecting gearing shown in Fig. 3 differs from the speed selecting gearing shown in Fig. 1 in that the speed selecting gearing shown in Fig. 3 incorporates constant mesh gears 16 and 19', and constant mesh gears 13 and 19'', in combination with an axially shiftable clutch collar 23 which is mounted on the driven shaft 4 in nonrotatable relation thereto. The gear 19' in Fig. 3 is rotatably mounted on the driven shaft 4 and retained in axially fixed position by a double row ball bearing 24, and the gear 19'' in Fig. 3 is rotatably mounted on the driven shaft 4 and retained in axially fixed position by means of a double row ball bearing 26. The clutch collar 23 has a circumferential series of external clutch teeth 27 which are engageable with internal clutch teeth 28 of the gear 19' upon shifting movement of the clutch collar 23 toward the right from the neutral position in which the clutch collar is shown in Fig. 3, and another circumferential series of external clutch teeth 29 on the clutch collar 23 is engageable with a complementary series of internal clutch teeth 31 on the gear 19'' upon shifting movement of the clutch collar 23 from its neutral position to the left in Fig. 3.

The range and speed selecting gearings shown in Fig. 3 afford a high and a low range, three forward drive reduction ratios in each range, and three reverse drive reduction ratios irrespective of the condition of the range selecting gearing. In these respects, the transmission shown in Fig. 3 is similar to the one shown in Fig. 1. However, the following should be noted with respect to the consecutive selection of the various speeds in ascending order, which differs in certain respects from the corresponding selection of speeds in the transmission shown in Fig. 1.

For first or lowest forward speed, the gear 8 in Fig. 3 is shifted into mesh with the gear 7 to establish the low range, and the clutch collar 23 is shifted to the right in Fig. 3 so as to couple the gear 19' with the driven shaft 4.

For second forward speed, the gear 9 in Fig. 3 is shifted into mesh with the gear 6 to establish the high range, and the clutch collar 23 is shifted to the right in Fig. 3 into clutching engagement with the gear 19'.

For third forward speed, the gear 8 in Fig. 3 is shifted into mesh with the gear 7 to establish the low range, and the gear 18 is shifted into mesh with the gear 14.

For fourth forward speed, the gear 9 in Fig. 3 is shifted into mesh with the gear 6 to establish the high range, and the gear 18 is shifted into mesh with the gear 14.

For fifth forward speed the gear 8 in Fig. 3 is shifted into mesh with the gear 7 to establish the low range, and the gear 17 is shifted into mesh with the gear 7.

For sixth or highest forward speed, the gear 9 in Fig. 3 is shifted into mesh with the gear 6 to establish the high range, and the gear 17 is shifted into mesh with the gear 7.

For first or lowest reverse speed, the clutch collar 23 in Fig. 3 is shifted into clutching engagement with the gear 19'' which, as stated, permanently meshes with the gear 13.

For second or intermediate reverse speed, the gear 18 in Fig. 3 is shifted into mesh with the gear 12.

For third or highest reverse speed, the gear 17 in Fig. 3 is shifted into mesh with the gear 6. In this condition, the transmission affords the lowest available reverse drive reduction ratio.

It will be noted that in the transmission shown in Fig. 3, like in the transmission shown in Fig. 1, any one of the three reverse drives may be established while the range selecting gears 8 and 9 are in neutral, and that any one of the reverse drives may also be established when the range selecting gearing is either in high range or in low range condition.

The following is a table of representative tooth numbers which may be given to the various gears of the transmission as shown in Fig. 3:

| | |
|---|---|
| 33 teeth on gear 6 | 24 teeth on gear 14 |
| 32 teeth on gear 7 | 16 teeth on gear 16 |
| 28 teeth on gear 8 | 32 teeth on gear 17 |
| 28 teeth on gear 9 | 41 teeth on gear 18 |
| 24 teeth on gear 12 | 49 teeth on gear 19 |
| 15 teeth on gear 13 | 49 teeth on gear 19 |

Figure 5:
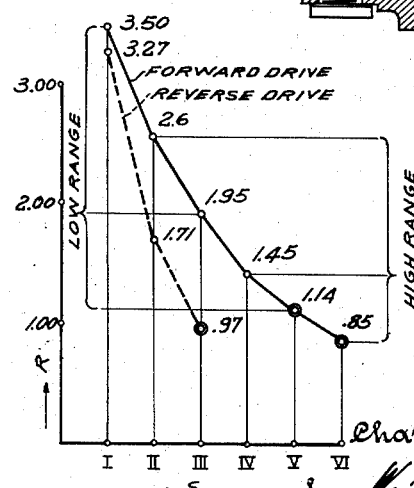
Fig. 5 is a diagram of the forward and reverse drive reduction ratios afforded by the transmission shown in Fig. 3.

The six available forward drive reduction ratios and the three available reverse drive reduction ratios afforded by the transmission shown in Fig. 3 are plotted in the diagram shown in Fig. 5, the various ratios R for the respective speeds S being calculated on the basis of the representative tooth numbers set forth hereinbefore with reference to Fig. 3.

Referring to Fig. 5, it will be noted that the range and speed selecting gearing shown in Fig. 3, if arranged and proportioned as indicated hereinbefore for purposes of exemplification, affords a relatively high forward drive reduction ratio of 3.50 and two relatively low forward drive reduction ratios of 1.95 and 1.14, respectively, in low range, and a relatively high forward drive reduction ratio of 2.6 and two relatively low forward drive reduction ratios of 1.45 and .85 in high range. As to the reverse drive reduction ratios, the diagram of Fig. 5 shows that these, like the forward drive reduction ratios, are adequately proportioned to meet the speed requirements of a transmission for a heavy duty motor vehicle, such as an extremely powerful crawler tractor. As shown in Fig. 5, the lowest available reverse drive reduction ratio is .97, and this ratio reverse drive reduction ratio is not lower than the lowest available forward drive reduction ratio in high range, which is .85.

It will further be noted that the range and speed selecting gearing as shown in Fig. 3 has the same advantage with respect to the triple use of the speed selecting gear 17 which has been explained hereinbefore in connection with Fig. 1.

From Figs. 3 and 5, it will further be noted that cooperation of the speed selecting gear 17 with the axially fixed gear 7 establishes a relatively low forward drive reduction ratio of .85 when the range selecting gearing is in high range condition, and a higher forward drive reduction ratio of 1.14 when the range selecting gearing is in low range condition, and that the reverse drive reduction ratio of .97 which is afforded by cooperation of the speed selecting gear 17 with the gear 6 is higher than the low forward drive reduction ratio of .85 and lower than the forward drive reduction ratio of 1.14.

Comparing the diagram of Fig. 4 with the diagram of Fig. 5, it will be noted that in the transmission shown in Fig. 1, as well as in the transmission shown in Fig. 3, the forward drive reduction ratios available in one range are staggered relative to the forward drive reduction ratios available in the other range, so that the first or lowest speed may be selected in low range, the second or next higher speed may be selected in high range, and the third or next higher speed may be selected in low range, two of the remaining higher forward speeds being available in one range, and the other remaining high forward speed being available in the other range. In the transmission as shown in Fig. 1, the fifth and sixth speeds are available in the high range and the fourth speed is available in the low range, whereas in the transmission shown in Fig. 3, the fourth and sixth speeds are available in the high range and the fifth speed is available in the low range.

In general terms, the herein disclosed type of change speed transmission comprises a drive gear which is mounted in an axially fixed position on a rotatable driving shaft for rotation in unison therewith, such gear and drive shaft being represented in the illustrated embodiments of the invention by the gear 6 and shaft 2; further, a rotatable countershaft at a predetermined transverse spacing from said driving shaft, and range selecting gearing operable to alternatively establish high and low ratio unidirectional driving connections between said driving and countershafts and including said drive gear and a countergear mounted on said countershaft at a predetermined axial spacing from said drive gear. In the illustrated embodiments of the invention, the mentioned countergear is represented by the gear 7 whose axial spacing from the drive gear 6 is determined by the lock ring 10. A driven gear which is represented in the illustrated embodiments of the invention by the gear 17, is mounted on a driven shaft in nonrotatable relation thereto for shifting movement from a neutral position selectively in one direction into mesh with said axially fixed countergear and in the other direction into mesh with said axially fixed drive gear. This arrangement provides for establishment of a driving connection between the counter gear 7 and the driven shaft 4 independent of the drive gear 6, and for alternative establishment of a driving connection between the drive gear 6 and the driven shaft 4 independent of the countergear 7.

It should be understood that it is not intended to limit the invention to the particular forms and details described hereinabove and that the invention includes such other forms and modifications as are embraced by the scope of the appended claims.

It is claimed and desired to secure by Letters Patent:

1. A change speed transmission comprising, in combination, a drive gear mounted in axially fixed position on a rotatable driving shaft for rotation in unison therewith, a rotatable countershaft at a predetermined transverse spacing from said driving shaft, range selecting gearing operable to alternatively establish high and low ratio unidirectional driving connections between said driving and countershafts and including said drive gear and a countergear mounted on said countershaft at a predetermined axial spacing from said drive gear, a rotatable driven shaft at a predetermined transverse spacing from said driving and countershafts, and a driven gear mounted on said driven shaft in nonrotatable relation thereto for shifting movement from a neutral position selectively in one direction into mesh with said axially fixed countergear and in the other direction into mesh with said axially fixed drive gear.

2. A change speed transmission as set forth in claim 1, and further comprising a pair of supplemental drive and countergears mounted, respectively, on said driving and countershafts, and driven gear means cooperable selectively with said supplemental drive and countergears to either connect said driven shaft in driven relation with said supplemental countergear independently of said supplemental drive gear, or to connect said driven shaft in driven relation with said supplemental drive gear independently of said supplemental countergear.

3. A change speed transmission as set forth in claim 2, in which said driven gear means comprise a supplemental axially shiftable driven gear on said driven shaft, selectively movable from a neutral position in one direction into mesh with said supplemental countergear and in the other direction into mesh with said supplemental drive gear.

4. A change speed transmission as set forth in claim 2, in which said driven gear means comprise a pair of supplemental driven gears mounted in axially fixed positions on said driven shaft for rotation relative thereto and in constant mesh, respectively, with said supplemental drive and countergears; and clutch means operable to selectively connect one or the other of said supplemental driven gears with said driven shaft for rotation in unison therewith.

5. A change speed transmission comprising, in combination, a rotatable driving shaft, a drive gear mounted in axially fixed position on said driving shaft for rotation in unison therewith, a rotatable countershaft spaced transversely from and extending parallel to said driving shaft, a counter gear mounted on said countershaft for rotation in unison therewith at a predetermined axial spacing from said drive gear, means including a first mating gear on said driving shaft meshable with teeth of said countergear and a second mating gear on said countershaft meshable with teeth of said drive gear, for alternatively establishing a first range and a second range driving connection between said driving and countershafts, a driven shaft extending parallel to and spaced transversely from said driving and countershafts, and a speed selecting gear nonrotatably mounted on said driven shaft in axially shiftable relation thereto, said speed selecting gear having teeth meshed with said teeth of said countergear upon axial shifting movement of said speed selecting gear from a neutral position in one direction, and said teeth of said speed selecting gear being meshed with said teeth of said drive gear upon axial shifting movement of said speed selecting gear from said neutral position in the opposite direction.

6. A change speed transmission as set forth in claim 5, in which said axially fixed drive gear, second mating gear and speed selecting gear are so proportioned as to permit simultaneous meshing engagement of said second mating gear and of said speed selecting gear with said drive gear.

7. A change speed transmission as set forth in claim 5, in which said axially fixed countergear, first mating gear and speed selecting gear are so proportioned as to permit simultaneous meshing engagement of said first mating gear and of said speed selecting gear with said countergear.

8. A change speed transmission as set forth in claim 5, in which said axially fixed drive and countergears, first and second mating gears and speed selecting gear are so proportioned as to permit meshing engagement of said speed selecting gear with said drive gear while the latter is in mesh with said second mating gear, and so as to permit meshing engagement of said speed selecting gear with said countergear while the latter is in mesh with said first mating gear.

9. A double range transmission comprising, in combination, an axially fixed drive gear and a first axially shiftable range selecting gear each mounted on a driving shaft in nonrotatable relation thereto, an axially fixed countergear and a second axially shiftable range selecting gear each nonrotatably mounted on a countershaft extending parallel to and spaced transversely from said driving shaft, said first range selecting gear being shiftable from a neutral position into mesh with said countergear, and said second range selecting gear being shiftable from a neutral position into mesh with said drive gear; a driven shaft extending parallel to and spaced transversely from said driving and countershafts; and an axially shiftable speed selecting gear nonrotatably secured to said driven shaft, said speed selecting gear being shiftable selectively from a neutral position in one direction into mesh with said countergear and in the opposite direction into mesh with said drive gear.

10. A double range transmission as set forth in claim 9, in which the pitch diameter of said drive gear is larger than the pitch diameter of said second range selecting gear.

11. A double range transmission as set forth in claim 9, in which the pitch diameter of said countergear is larger than the pitch diameter of said first range selecting gear.

12. A double range transmission as set forth in claim 9, in which the pitch diameter of said drive gear is larger than the pitch diameter of said second range selecting gear, and in which the pitch diameter of said countergear is larger than the pitch diameter of said first range selecting gear.

13. A double range transmission as set forth in claim 12, in which said drive and countergears, first and second range selecting gears and said speed selecting gear are so proportioned as to permit meshing engagement of said speed selecting gear with said drive gear while the latter is in mesh with said second range selecting gear, and so as to permit meshing engagement of said speed selecting gear with said countergear while the latter is in mesh with said first range selecting gear.

14. A change speed transmission comprising, in combination, a drive gear mounted in axially fixed position on a rotatable driving shaft for rotation in unison therewith, a rotatable countershaft at a predetermined transverse spacing from said driving shaft, range selecting gearing operable to alternatively establish high and low ratio unidirectional driving connections between said driving and countershafts and including said drive gear and a countergear mounted on said countershaft at a predetermined axial spacing from said drive gear, a rotatable driven shaft at a predetermined transverse spacing from said driving and countershafts, and speed selecting gearing comprising said drive gear, said countergear and means selectively operable to either establish a driving connection between said drive gear and said driven shaft independent of said countergear, or to establish a driving connection between said countergear and said driven shaft independent of said drive gear.

15. A double range transmission comprising, in combination, an axially fixed drive gear and a first axially shiftable range selecting gear each mounted on a driving shaft in nonrotatable relation thereto, an axially fixed countergear and a second axially shiftable range selecting gear each nonrotatably mounted on a countershaft extending parallel to and spaced transversely from said driving shaft, said first range selecting gear being shiftable from a neutral position into mesh with said countergear, and said second range selecting gear being shiftable from a neutral position into mesh with said drive gear; a driven shaft extending parallel to and spaced transversely from said driving and countershafts; and speed selecting gearing comprising said axially fixed drive gear, said axially fixed countergear, and means selectively operable to either establish a driving connection between said axially fixed drive gear and said driven shaft independent of said axially fixed countergear and of said first and second range selecting gears, or to establish a driving connection between said axially fixed countergear and said driven shaft independent of said axially fixed drive gear and of said first and second range selecting gears.

CHARLES H. HERR, Jr.

REFERENCES CITED

The following references are of record in the file of this patent:

UNITED STATES PATENTS

| Number | Name | Date |
|---|---|---|
| 1,269,944 | Leonard | June 18, 1918 |
| 1,870,969 | Snow | Aug. 9, 1932 |
| 2,010,556 | Nenninger et al. | Aug. 6, 1935 |
| 2,220,197 | Ariens | Nov. 5, 1940 |
| 2,431,727 | Bennett | Dec. 2, 1947 |

FOREIGN PATENTS

| Number | Country | Date |
|---|---|---|
| 558,392 | Great Britain | Jan. 4, 1944 |